Nov. 15, 1966  C. E. McMANAMA  3,285,301
LUMBER EDGER SAW ASSEMBLY INCORPORATED INTO
A HORIZONTAL TRAVERSING BANDSAW MACHINE
Filed Nov. 15, 1963
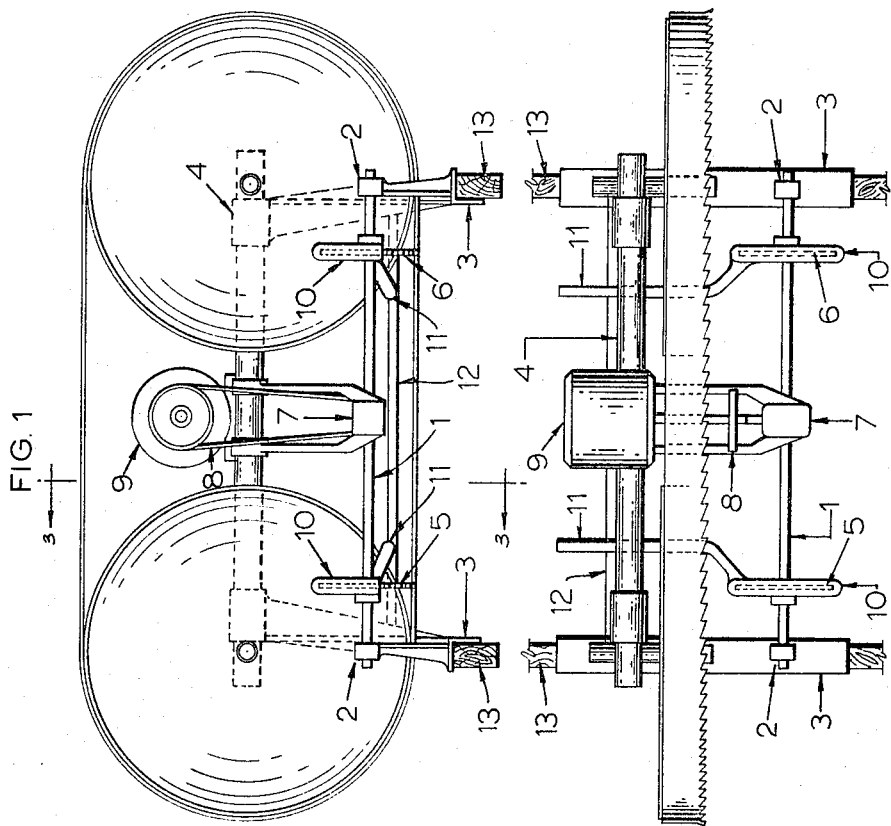
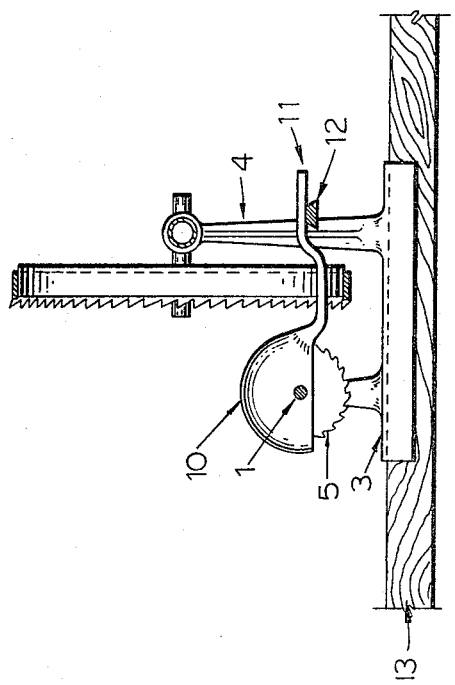
INVENTOR
BY

United States Patent Office 3,285,301
Patented Nov. 15, 1966

3,285,301
LUMBER EDGER SAW ASSEMBLY INCORPORATED INTO A HORIZONTAL TRAVERSING BANDSAW MACHINE
Charles E. McManama, Potlatch, Idaho
Filed Nov. 15, 1963, Ser. No. 324,015
3 Claims. (Cl. 143—1)

It is seen desirable from the standpoint of efficiency and utility in the use of horizontal bandsaw sawmills in which the saw traverses upon a guide rail in sawing, to incorporate an edger into the machine. Although other types of sawmills are known in which the edger saws are so incorporated, due to the inherent differences of a traversing bandsaw sawmill and the various components in relation to which including means which lend to light weight hand portable operation as in my Patents 3,168,-127 and 3,213,905, adaptations of an edger saw assembly have been devised that are new and unique. The instant invention relates to new and unique adaptations which are of great value in promoting ease of operation, economy in manufacture, and light weight that is necessary if the sawmill is to be of a hand portable nature.

This edger saw assembly is composed of a system of circular saws which are slidably mounted on a horizontal powered shaft which is divided in the center by a driving gear assembly. This system is mounted upon the traversing bandsaw carriage in front of the bandsaw in such a manner that the edger saws score the face of the log to the depth which the bandsaw will saw from the log, resulting in edged lumber. Each edger saw has a shroud over its top half which is mounted on a bearing to the saw hub. These shrouds, besides acting as guards against operating hazard and flying sawdust, act as bases for rigidly attached handles for sliding the saws upon the shaft for different settings.

An embodiment of the invention is hereinafter particularly described with reference to the accompanying drawings, wherein:

FIGURE 1 shows a front view;
FIGURE 2 shows a top view;
FIGURE 3 shows a side view.

Described further in the accompanying drawing, the ends of the edger saw shaft 1 are mounted in bearings 2 upon the guide rail shoes 3 of the horizontal traversing bandsaw carriage 4, traversing upon guide rail 13. Saws 5 and 6 are slidably mounted upon splined shaft 1 to determine the width of the edged board. The centrally located gearbox 7 driving the edger shaft 1, has a belt drive 8 which receives power from the centrally located engine 9. Saw shrouds 10 and handles 11 are moved as desired to properly space the edger saws. Handles 11 resting on guide 12 keep the saw shrouds 10 upright, and when the corresponding part of each said handle rests in a proper calibrated detent on said guide, the corresponding edger saw is accurately set. Guide 12 comprises a bar from bandsaw carriage 4 extending laterally across the bandsaw throat. (Said guide 12 is shown only in cross section thereof, in FIGURE 3.)

Having thusly described my invention which I desire to protect by Letters Patent, I make the following claims of invention:

1. In a traversing saw carriage slidably mounted upon side rails straddling a workpiece, carrying both a horizontal bandsaw and a horizontal assembly of circular saws thereon, the bandsaw pulleys thereof spaced apart over the workpiece and defining a throat for said workpiece therebetween, the horizontal assembly of circular saws individually and slidably mounted upon a powered splined shaft and installed in front of the bandsaw throat in such a manner that cuts made by the circular saws extend to the plate of cutting assumed by the bandsaw, an improvement comprising: said circular saws having upon each saw thereof a shroud over its top half to which a handle is rigidly connected, said handles extending between the bandsaw pulleys to the rear conveniently accessible to the operator, and each said shroud rotatably mounted to its saw's hub upon a low friction bearing.

2. In a mechanism as set forth in claim 1, the said shrouds being held in an upright position by a guide bar supported from the bandsaw carriage and upon which each shroud is engaged by an appendage therefrom, and upon said guide bar being a detent means upon which each said appendage may engage and be adjusted laterally thereupon.

3. In a mechanism as set forth in claim 2, aforesaid powered shaft mounted at its center on a powering gear assembly, the housing of which is supported from the bandsaw frame.

References Cited by the Examiner

UNITED STATES PATENTS

| | | | |
|---|---|---|---|
| 683,590 | 10/1910 | Brower | 143—47 |
| 1,111,331 | 9/1914 | Tower | 143—37 |
| 1,551,964 | 9/1925 | Mitchell | 143—1 |
| 2,800,932 | 7/1957 | Scott | 143—47 X |

FOREIGN PATENTS

| | | |
|---|---|---|
| 904,386 | 2/1945 | France. |
| 973,388 | 9/1950 | France. |
| 787,724 | 12/1957 | Great Britain. |

DONALD R. SCHRAN, *Primary Examiner.*